(12) United States Patent
Hill et al.

(10) Patent No.: US 6,836,335 B2
(45) Date of Patent: Dec. 28, 2004

(54) MULTI-AXIS INTERFEROMETER (75) Inventors: Henry A. Hill, Tucson, AZ (US); Andrew Eric Carlson, Higganum, CT (US); Peter J. De Groot, Middletown, CT (US)

(73) Assignee: Zygo Corporation, Middlefield, CT (US)

(*) Notice: Subject to any disclaimer, the term of this patent is extended or adjusted under 35 U.S.C. 154(b) by 19 days.

(21) Appl. No.: 10/190,752

(22) Filed: Jul. 8, 2002

(65) Prior Publication Data

US 2003/0030818 A1 Feb. 13, 2003

Related U.S. Application Data (60) Provisional application No. 60/303,557, filed on Jul. 6, 2001.

(51) Int. Cl.[7] .............................. G01B 9/02; G01B 11/00; G01B 9/21; G01C 19/72; F16M 1/00
(52) U.S. Cl. ................... 356/493; 356/400; 356/450; 356/462; 356/471; 248/664
(58) Field of Search ........................ 356/493, 400, 356/450, 462, 471; 248/664

(56) References Cited

U.S. PATENT DOCUMENTS

| | | | |
|---|---|---|---|
| 4,752,133 A | 6/1988 | Sommargren | 356/349 |
| 4,802,764 A | 2/1989 | Young et al. | 356/349 |
| 4,802,765 A | 2/1989 | Young et al. | 356/349 |
| 4,859,066 A | 8/1989 | Sommargren | 356/349 |
| 4,881,815 A | 11/1989 | Sommargren | 356/349 |
| 4,881,816 A | 11/1989 | Zanoni | 356/349 |
| 4,883,357 A | 11/1989 | Zanoni et al. | 356/349 |
| 5,064,289 A | 11/1991 | Bockman | 356/351 |
| 5,543,914 A * | 8/1996 | Henshaw et al. | |
| 5,801,832 A * | 9/1998 | Van Den Brink | |
| 6,020,964 A | 2/2000 | Loopstra et al. | 356/358 |
| 6,084,673 A | 7/2000 | Van Den Brink et al. | 356/358 |
| 6,122,058 A * | 9/2000 | Van Der Werf et al. | |
| 6,163,379 A | 12/2000 | de Groot | 356/493 |
| 6,201,609 B1 | 3/2001 | Hill et al. | 356/491 |
| 6,208,424 B1 | 3/2001 | de Groot | 356/500 |
| 6,536,736 B2 * | 3/2003 | Wayne et al. | |
| 6,542,247 B2 * | 4/2003 | Bockman | |

* cited by examiner

Primary Examiner—Gregory J. Toatley, Jr.
Assistant Examiner—Khaled Brown
(74) Attorney, Agent, or Firm—Fish & Richardson P.C.

(57) ABSTRACT

A multi-axis interferometer includes a mounting block with first and second polarizing beam-splitter cubes contacting first and second faces of the mounting block. A beam-distribution system contacts a third face of the mounting block. The beam-distribution system is thus placed in optical communication with the first polarizing beam-splitter cube and the second polarizing beam-splitter cube.

20 Claims, 6 Drawing Sheets

MULTI-AXIS INTERFEROMETER

RELATED APPLICATIONS

This application claims the benefit of the Jul. 6, 2001 priority date of U.S. Provisional Application 60/303,557, entitled "Multi-axis Interferometer," the contents of which are herein incorporated by reference.

FIELD OF INVENTION

This invention relates to distance-measuring equipment, and in particular, to interferometers.

BACKGROUND

In the fabrication of an integrated circuit, there are steps during which a wafer rests on a moveable stage under a projector. As the stage moves, it experiences linear translation in a direction parallel to one of two coordinate axes that define the plane of the wafer. In addition, the stage experiences rotation about any of the three coordinate axes. During these steps, it is desirable to know, with great precision, the position and orientation of the moveable stage relative to the projector.

One approach to determining the motion of the stage is to use an interferometer to determine the distance to a measurement spot along the edge of the stage. This, however, only provides the extent to which the stage has translated along one of the coordinate axes. It does not provide information on the rotation of the stage about the three coordinate axes.

To obtain information about both the rotation and the translation of the stage, it is known to use three interferometers to measure the distance to three different reference spots that define a triangle on the edge of the stage. From these three distance measurements, one can infer the extent and direction of rotation experienced by the stage. For example, if a first reference spot is found to have moved closer to the interferometer and a second reference spot immediately below the first spot is found to have moved further from the interferometer, one can infer that the plate has rotated about a line joining the first and second reference spots. From the relative positions and distances to the first and second reference spots, one can calculate the extent of this rotation.

SUMMARY

The invention provides a multi-axis interferometer in which constituent optical elements are supported by a single mounting block.

In one aspect, the multi-axis interferometer includes a mounting block and first and second polarizing beam-splitter cubes contacting first and second faces of the mounting block. A beam-distribution system, which is in optical communication with the first and second polarizing beam-splitter cubes, contacts a third face of the mounting block.

The multi-axis interferometer can also include one or more retro-reflectors. These retro-reflectors are in optical communication with the first polarizing beam-splitter cube, the second polarizing beam-splitter cube, or both. The retro-reflector can be a polarization preserving retro-reflector.

In some embodiments, the retro-reflectors optically contact the polarizing beam-splitter cubes. In other embodiments, they optically contact the mounting block.

Other embodiments of the interferometer are those in which a retarder optically contacts one or both of the first and second polarizing beam-splitter cubes. The retarder includes first and second substrates separated by a gap, with an adhesive material filling that gap. A birefringent polymer is embedded in the adhesive material. The adhesive material and the birefringent polymer are selected to be index matched to each other.

The mounting block can be a solid block. However, some embodiments of the invention include a mounting block having walls forming one or more tunnels extending between first and second faces thereof. Some of these tunnels can be disposed to permit passage of a light beam between the beam-distribution system and one of the first and second polarizing beam-splitter cubes.

In another aspect, the invention includes a method of obtaining an interferometric measurement by optically contacting a first polarizing beam splitter cube to a first face of a mounting block; optically contacting a second polarizing beam splitter cube to a second face of a mounting block; and optically contacting a beam-distribution system to a third face of the mounting block, thereby placing the beam-distribution system in optical communication with the first polarizing beam-splitter cube and the second polarizing beam-splitter cube.

In other embodiments, first and second sub-aperture coatings are placed on a first face of a first prism in the beam delivery system. A second face of a second prism optically contacts the first and second sub-aperture coatings.

An interferometer system according to the invention can have one or more of the following advantages.

The mounting block absorbs most of the stresses associated with mounting the interferometer to a base plate and avoids transmitting those stresses to the other components of the interferometer.

The optional tunnels in the mounting block reduce the path length traversed by the beams in glass, thereby avoiding undesired distortions resulting from imperfections in the glass.

Optical contacting of prisms in the beam delivery system reduces reflections and wavefront distortions resulting from the crossing of boundaries between transmission media.

Polymer retarders reduce stray reflections resulting from using conventional quartz wave plates.

These and other features of the invention will be apparent from the following detailed description and the accompanying figures, in which:

DETAILED DESCRIPTION

Figure 1:
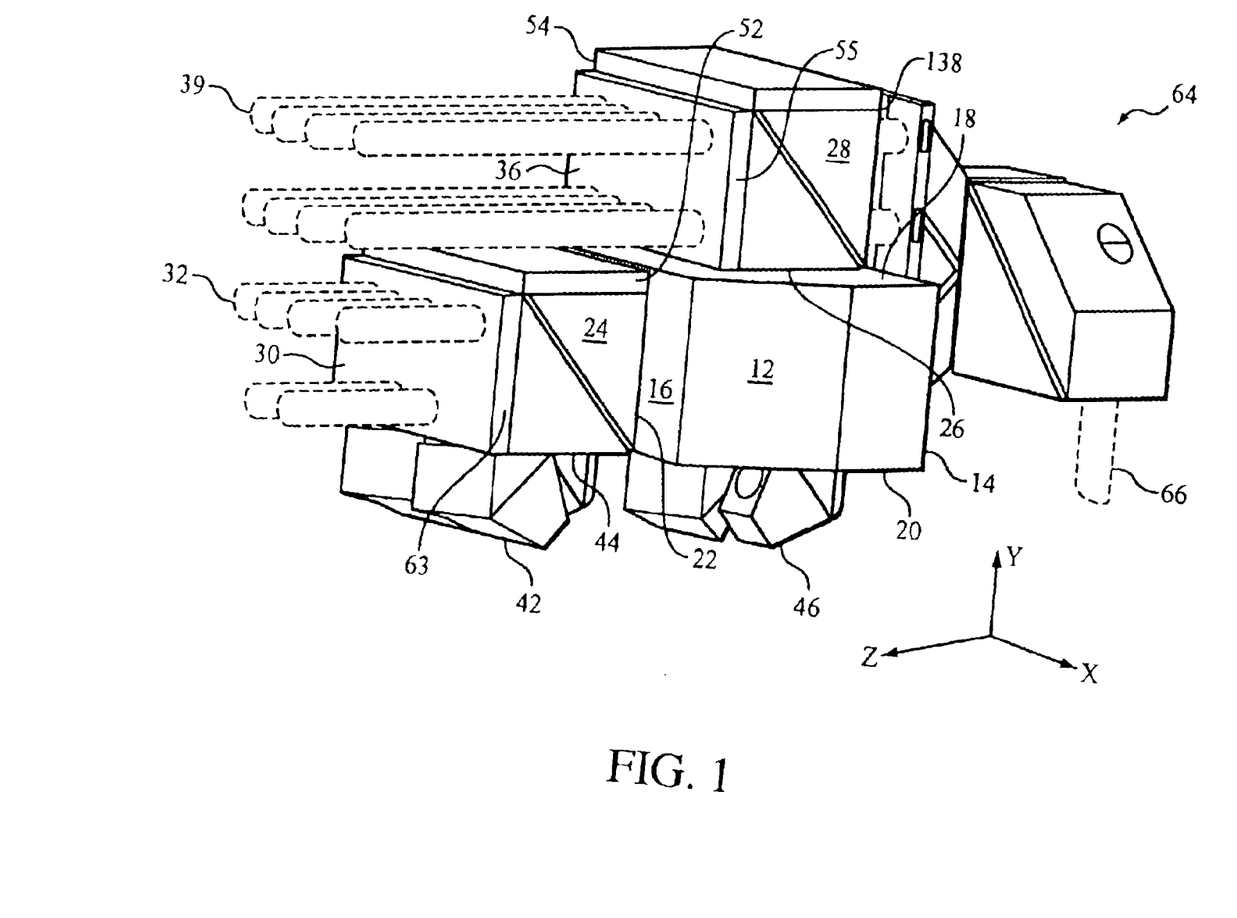
FIG. 1 is an isometric view of an interferometer incorporating the invention.

Referring to FIG. 1, an interferometer 10 incorporating the invention includes a mounting block 12 having a proximal face 14, a distal face 16, a top face 18, and a bottom face 20. The distal face 16 optically contacts an input face 22 of a first polarizing-beam-splitter cube 24 (hereafter referred to as the "first cube"). The top face 18 optically contacts a bottom face 26 of a second polarizing-beam-splitter cube 28 (hereafter referred to as the "second cube").

The mounting block 12 is the only component of the interferometer 10 that makes contact with a metal base plate. Accordingly, any mechanical stresses associated with the mounting of the interferometer 10 are absorbed by the mounting block 12. The mounting block 12 thus serves to insulate the more sensitive components of the interferometer 10 from deformation resulting from such stresses.

The first cube 24 has a measurement face 30 parallel to the distal face 16 of the mounting block 12. It is through this measurement face 30 that measurement beams 32 emerge. These measurement beams 32 are used to illuminate a stationary reference mirror 34, shown in FIG. 2. Similarly, the second cube 28 has a measurement face 36 parallel to the distal face 16 of the mounting block 12. Measurement beams 39 emerging from this measurement face 36 are used to illuminate a mirror mounted on a moving stage 38, also shown in FIG. 2.

Figure 3:
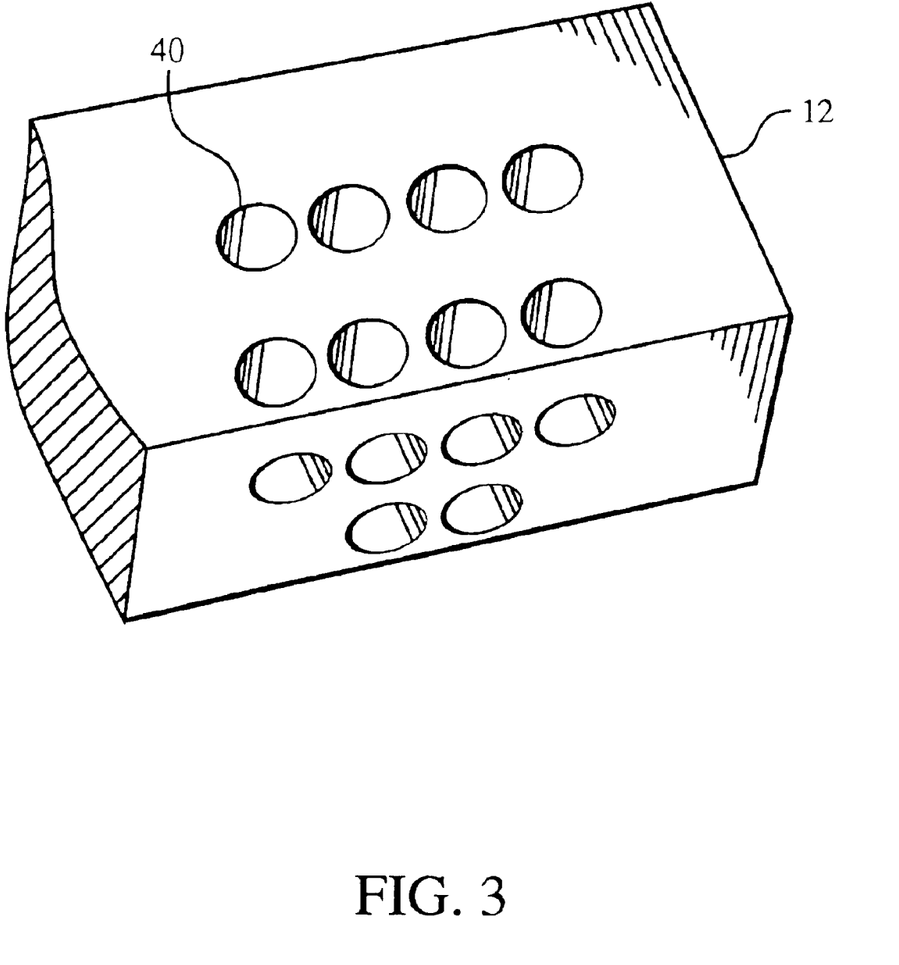
FIG. 3 is an isometric view of the mounting block of the interferometer of FIG. 1.

The mounting block 12 and the cubes 24, 28 are made of the same glass and are therefore subjected to the same thermal stresses. Preferably, the mounting block 12 has internal walls that form tunnels 40 along paths through which light beams are intended to pass, as shown in FIG. 3. These tunnels 40 enable light beams passing therethrough to travel in free space rather than through glass. By reducing the extent to which beams pass through glass, the tunnels 40 reduce the likelihood that imperfections in the glass will affect the beam. These imperfections can cause wavefront distortion, path losses, and undesired birefringence. In addition, mounting stresses absorbed by the mounting block 12 will have no effect on beams passing through the tunnels 40.

Referring back to FIG. 2, a first retro-reflector array 42 is mounted in optical communication with a bottom face 44 of the first cube 24. A second retro-reflector array 46 mounted in optical communication with the bottom face 20 of the mounting block 12 opposite the bottom face 26 of the second cube 28 and separated therefrom by the height of the mounting block 12.

Figure 2:
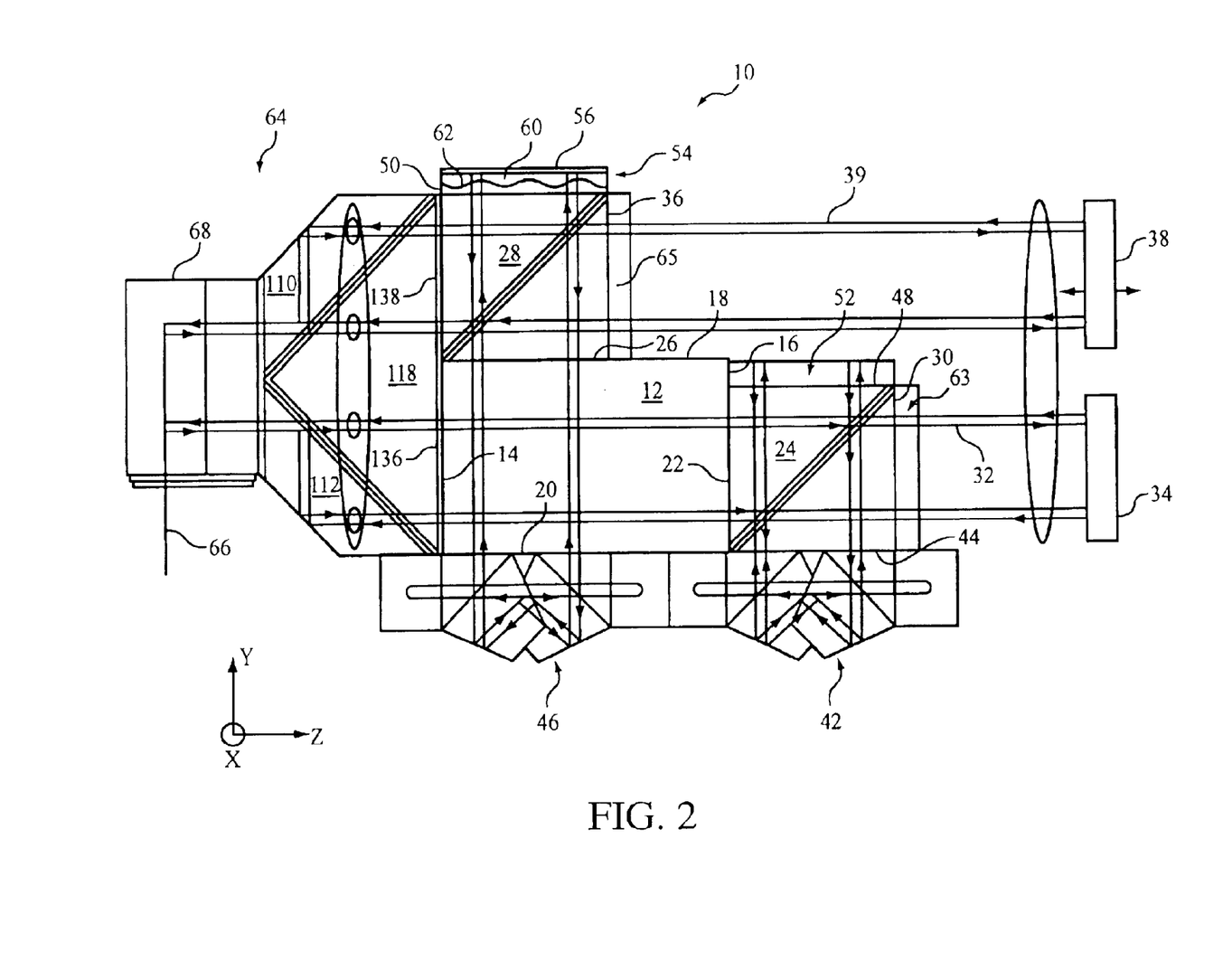
FIG. 2 is a cross-section along the elevation of the interferometer of FIG. 1.

The first retro-reflector array 42 includes three retro-reflectors disposed to reflect three light beams exiting the first cube 24 back into the first cube 24. The second retro-reflector array 46 includes four retro-reflectors disposed to reflect four light beams exiting the mounting block 12 back into the mounting block 12 and toward the second cube 28. The retro-reflectors are preferably, but need not be, polarization preserving retro-reflectors as described in U.S. Pat. No. 6,201,609, the contents of which are herein incorporated by reference.

Opposite the bottom faces 44, 26 of the first and second cubes 24, 28 are reference faces 48, 50 on which are mounted first and second retarders 52, 54. One or both of the retarders 52, 54 are of the type disclosed in a patent application entitled "Polymer Retarder" and filed on Jun. 25, 2002, the contents of which are herein incorporated by reference.

FIG. 2 shows in detail the second retarder 54, it being understood that the first retarder 52 can, but need not, have the same structure as the second retarder 54. The exemplary second retarder 54 includes a reflective glass layer 56 and a transmissive glass layer 58 separated by an adhesive layer 60 in which is embedded a birefringent polymer 62. The adhesive material that forms the adhesive layer 60 is selected such that its index of refraction is as close as possible to the average of the two indices of refraction (one for the extraordinary wave and one for the ordinary wave) of the birefringent polymer 62.

Third and fourth retarders 63, 65 are likewise mounted on the measurement faces 30, 36 of the first and second cubes. The third and fourth retarders 63, 65 are similar to the second retarder second retarder 54 the exception being that both of the glass layers of the third and fourth retarders 63, 65 are transmissive.

The interferometer 10 also includes a beam delivery system 64 whose function is to split a single input beam 66 into several output beams and to send those output beams into the first and second cubes 24, 28.

Figure 4:
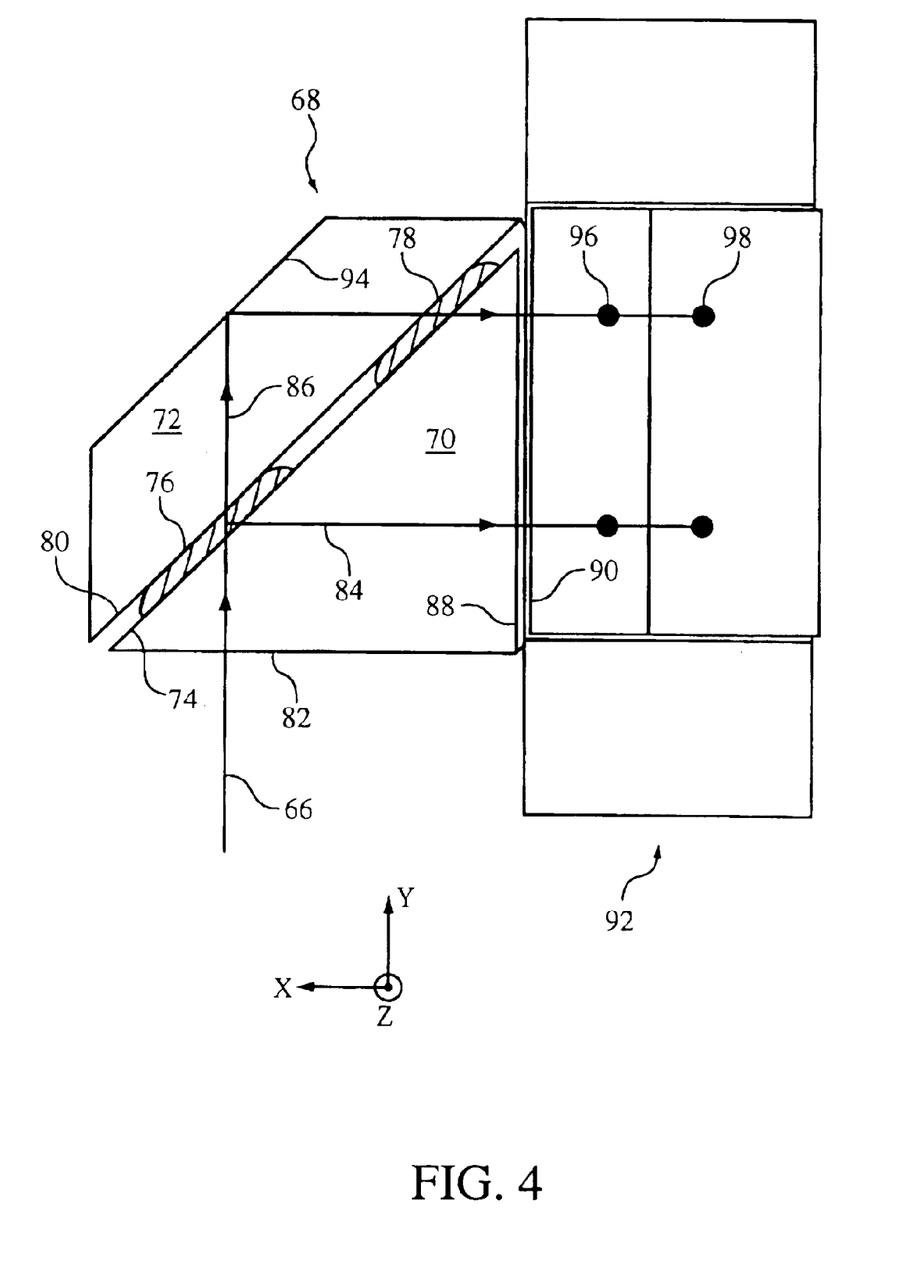
FIG. 4 is a cross-section of the first stage of the beam delivery system of the interferometer of FIG. 1.

Referring to FIG. 4, the beam delivery system 64 includes a first stage 68 having opposed first and second prisms 70, 72. The first prism 70 has a diagonal face 74 coated with first and second sub-aperture coatings 76, 78 of equal thickness. The first sub-aperture coating 76 is one that transmits half the light incident thereon and reflects the remainder. The second sub-aperture coating 78 is one that is index-matched to both the first and second prisms 70, 72. A diagonal face 80 of the second prism 72 optically contacts the first and second sub-aperture coatings 76, 78. The optical contacting of faces having one or more sub-aperture coatings is described in a U.S. patent application entitled "Optical Contacting of Surfaces with Sub-apertures" filed on Jun. 25, 2002, the contents of which are herein incorporated by reference.

The first stage 68 of the beam delivery system 64 is oriented such that the input beam 66 entering an input face 82 of the first prism 70 falls on the first sub-aperture coating 76, where it is split into a first and second portion 84, 86.

The first portion 84 of the input beam 66 is reflected toward an output face 88 of the first prism 70. This output face 88 optically contacts an input face 90 of a second stage 92 of the beam delivery system 64.

The second portion 86 of the input beam 66 proceeds through the first sub-aperture coating 76 and across the second prism 72 before being reflected off a reflective face 94 opposite and parallel to the diagonal face 80 of the second prism 72. After being reflected off the reflective face 94, the second portion 86 proceeds through the second sub-aperture coating 78, through the first prism 70, and toward the output face 88 of the first prism 70. The separation between the first and second portions 84, 86 of the input beam 66 provides the separation between the middle two rows of measurement beams 32, 39 in FIG. 1.

Figure 5:
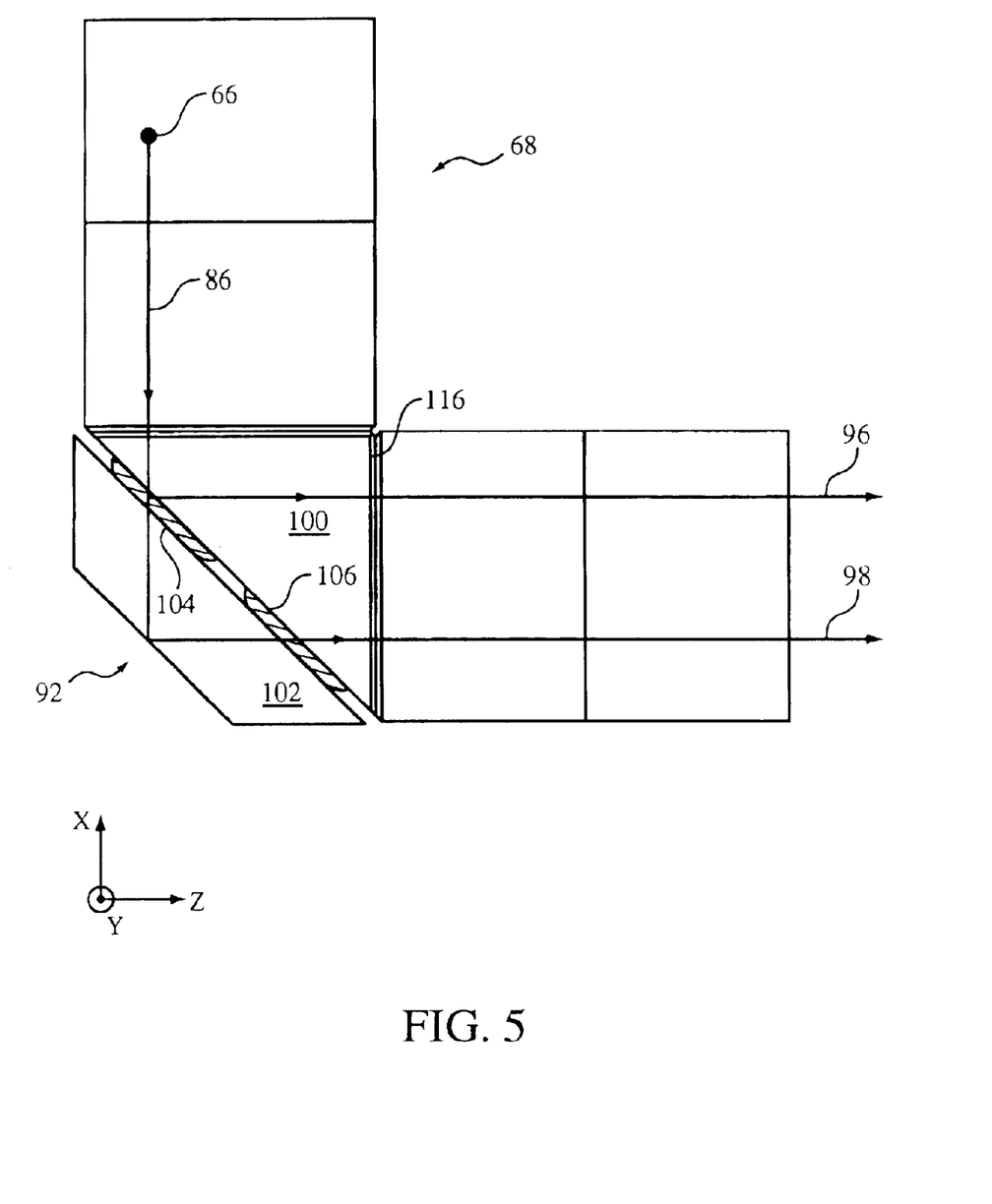
FIG. 5 is a cross-section of the second stage of the beam delivery system of the interferometer of FIG. 1.

The first and second portions 84, 86 of the input beam 66 are further subdivided in the second stage 92 of the beam delivery system 68. FIG. 5 shows a cross-section of the second stage 86 in which the second portion 86 of the input beam 66 is further subdivided into third and fourth portions 96, 98. The first portion 84 of the input beam 66 (which is not visible in FIG. 5) is further subdivided in the same way. The separation between the third and fourth portions corresponds to the separation between the inner two columns of measurement beams 31, 39 in FIG. 1. The separation between the outer two columns of measurement beams 31, 39 is controlled by the width of the retro-reflectors in the first and second retro-reflector arrays 42, 46.

As shown in FIG. 5, the second stage 92 also includes a prism assembly having a first prism 100 and a second prism 102 separated by first and second sub-aperture coatings 104, 106. The details of the structure and operation of the prism assembly are identical to those already described in connection with FIG. 4.

Figure 6:
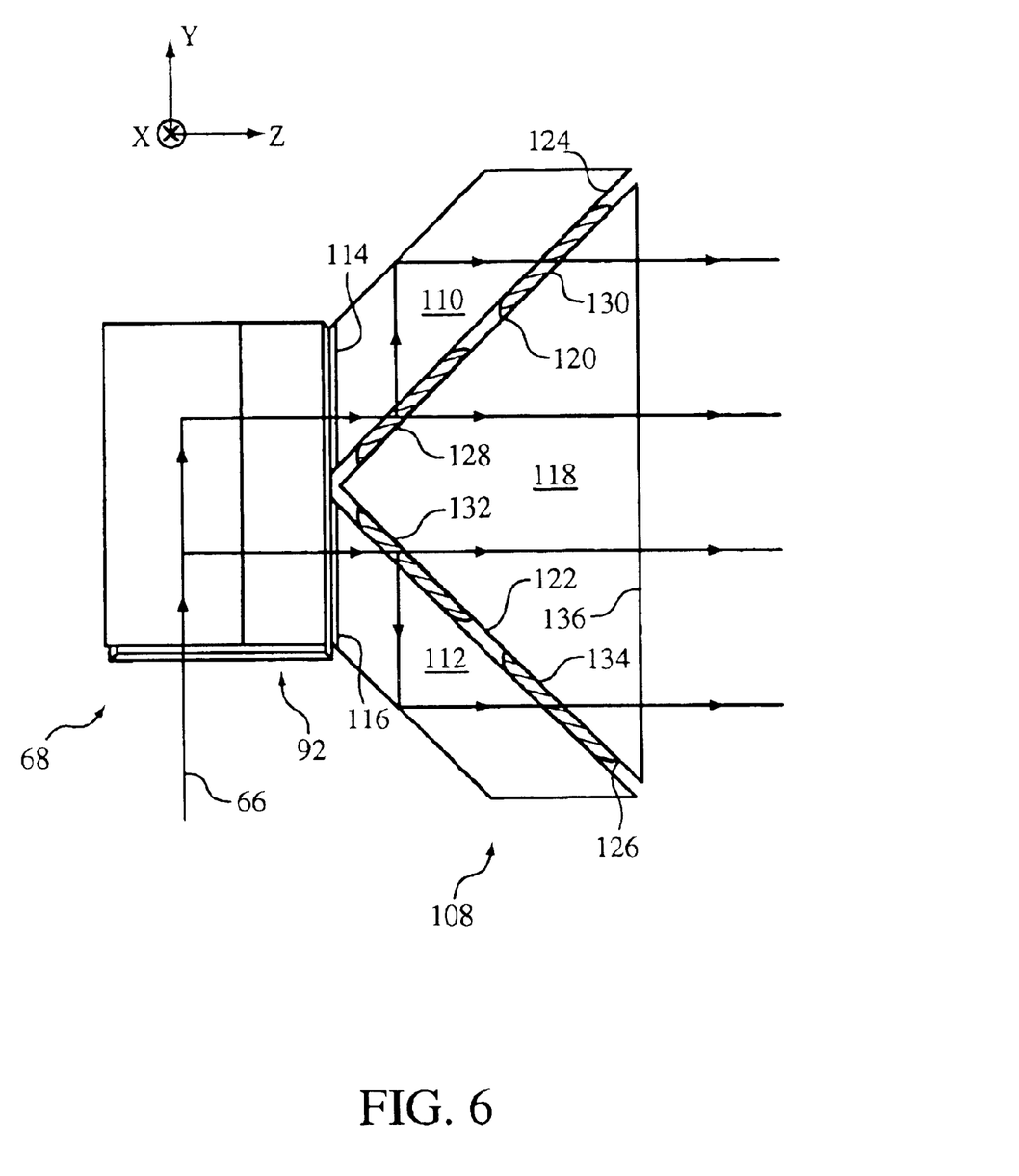
FIG. 6 is a cross-section of the third stage of the beam delivery system of the interferometer of FIG. 1.

The third and fourth portions 96, 98 of the input beam enter a third stage 108, shown in FIG. 6. The third stage 108 includes first and second prisms 110, 112 having input faces 114, 116 optically contacting an output face 116 of the first prism 100 on the second stage 92. These prisms 110, 112 have essentially the same structure as the second prisms 72, 102 of the first and second stages 68, 92.

A third prism 118 has first and second diagonal faces 120, 122 opposite corresponding diagonal faces 124, 126 of the first and second prisms 110, 112. The diagonal face 124 of the first prism 110 optically contacts first and second sub-aperture coatings 128, 130 on the first diagonal face 120 of the third prism 118. Similarly, the diagonal face 126 of the second prism 112 optically contacts first and second sub-aperture coatings 132, 134 on the second diagonal face 122 of the third prism 118. The two first sub-aperture coatings 128, 132 are made of a material that reflects half of the light incident thereon and transmits the other half. The two second sub-aperture coatings 130, 134 are made of a material that transmits virtually all the light incident thereon.

As shown in FIG. 2, an output face 136 of the third prism 118 optically contacts both the proximal face 14 of the mounting block 12 and an input face 138 of the second cube 28. The third stage 108 is positioned such that the beams passing through the second prism 112 pass through the mounting block 12 and into the first cube 24 and the beams passing through the first prism 110 pass directly into the second cube 28.

In some cases, the input beam 66 may be misaligned. When this occurs, the two orthogonally polarized components of the beam may lose their orthogonality. To remedy this, the interferometer 10 can include an input birefringent wedge through which the input beam passes 66 and one or more output birefringent wedges disposed to intercept the output beams of the interferometer 10. The structure and operation of the input and output wedges is fully described in a U.S. patent application entitled "Interferometry System and Method Employing and Angular Difference in Propagation Between Orthogonally Polarized Beam Components," filed on Jun. 17, 2002, the contents of which are herein incorporated by reference.

In other cases, the reference beam and the measurement beam at the output of the interferometer 10 can become displaced relative to one another. This results in a beam shear error in the interferometric measurement. To compensate for this type of error, the interferometer 10 can also include a wavefront planarizing fiber-optic pickup. An anamorphic system suitable for planarizing wavefronts is described fully in a U.S. patent application entitled "Method and Apparatus to Reduce Effects of Sheared Wavefronts on Interferometric Phase Measurements," filed on Jun. 24, 2002, the contents of which are herein incorporated by reference.

Having described the invention, and a preferred embodiment thereof, what we claim as new, and secured by letters patent is:

1. A multi-axis interferometer comprising:
   a mounting block;
   a first polarizing beam-splitter cube contacting a first face of the mounting block;
   a second polarizing beam-splitter cube contacting a second face of the mounting block; and
   a beam-distribution system contacting a third face of the mounting block, the beam-distribution system being in optical communication with the first polarizing beam-splitter cube and the second polarizing beam-splitter cube.

2. The multi-axis interferometer of claim 1, further comprising retro-reflector in optical communication with a selected polarizing beam-splitter cube selected from the group consisting of the first polarizing beam-splitter cube and the second polarizing beam-splitter cube.

3. The multi-axis interferometer of claim 2, wherein the retro-reflector is a polarization preserving retro-reflector.

4. The multi-axis interferometer of claim 2, wherein the retro-reflector optically contacts the selected polarizing beam-splitter cube.

5. The multi-axis interferometer of claim 2, wherein the retro-reflector optically contacts the mounting block.

6. The multi-axis interferometer of claim 1, further comprising a retarder optically contacting a selected polarizing beam-splitter cube selected from the group consisting of the first polarizing beam-splitter cube and the second polarizing beam-splitter cube, the retarder having:
   a first substrate;
   a second substrate separated from the first substrate by a gap;
   an adhesive material filling the gap; and
   a birefringent polymer embedded in the adhesive material;
   wherein the adhesive material and the birefringent polymer are selected to be index matched to each other.

7. The multi-axis interferometer of claim 1, wherein the mounting block comprises walls forming a tunnel extending from a first face of the mounting block to a second face of the mounting block.

8. The multi-axis interferometer of claim 7, wherein the tunnel is disposed to permit passage of a light beam between the beam-distribution system and one of the first and second polarizing beam-splitter cubes.

9. The multi-axis interferometer of claim 1, wherein the mounting block comprises the same material as at least one of the first and second polarizing beam-splitter cubes.

10. The multi-axis interferometer of claim 1, wherein the beam-distribution system comprises:
    a first prism having a first face;
    a first sub-aperture coating on the first face;
    a second sub-aperture coating on the first face;
    a second prism having a second face optically contacting the first and second sub-aperture coatings.

11. A method of obtaining an interferometric measurement, the method comprising:
    optically contacting a first polarizing beam splitter cube to a first face of a mounting block;
    optically contacting a second polarizing beam splitter cube to a second face of a mounting block; and
    optically contacting a beam-distribution system to a third face of the mounting block, thereby placing the beam-distribution system in optical communication with the first polarizing beam-splitter cube and the second polarizing beam-splitter cube.

12. The method of claim 11, further comprising providing a retro-reflector in optical communication with a selected polarizing beam-splitter cube selected from the group consisting of the first polarizing beam-splitter cube and the second polarizing beam-splitter cube.

13. The method of claim 12, wherein providing the retro-reflector comprises providing a polarization preserving retro-reflector.

14. The method of claim 12, wherein providing the retro-reflector comprises optically contacting the selected polarizing beam-splitter cube with the retro-reflector.

15. The method of claim 12, wherein providing the retro-reflector comprises optically contacting the retro-reflector with the mounting block.

16. The method of claim 11, further comprising
    selecting an adhesive material and a birefringent polymer that are index matched to each other;
    providing a retarder having a first substrate, and a second substrate separated from the first substrate by a gap filled with the adhesive material in which the birefringent polymer is embedded;
    optically contacting a retarder with a selected polarizing beam-splitter cube selected from the group consisting of the first polarizing beam-splitter cube and the second polarizing beam-splitter cube.

17. The method of claim 11, further comprising forming a tunnel extending from a first face of the mounting block to a second face of the mounting block.

18. The method of claim 17, further comprising placing the tunnel at a location that permits passage of a light beam between the beam-distribution system and one of the first and second polarizing beam-splitter cubes.

19. The method of claim 11, further comprising selecting the mounting block to be of the same material as at least one of the first and second polarizing beam-splitter cubes.

20. The method of claim 11, further comprising providing a beam-distribution system having:
    a first prism having a first face;
    a first sub-aperture coating on the first face;
    a second sub-aperture coating on the first face;
    a second prism having a second face optically contacting the first and second sub-aperture coatings.

* * * * *